United States Patent [19]

Chandramouli

[11] Patent Number: 4,897,170
[45] Date of Patent: Jan. 30, 1990

[54] MANUFACTURE OF A SODERBERG ELECTRODE INCORPORATING A HIGH CARBON-CONTRIBUTING PHENOLIC SACRIFICIAL BINDER

[75] Inventor: Pitchaiya Chandramouli, Louisville, Ky.

[73] Assignee: Borden, Inc., Columbus, Ohio

[21] Appl. No.: 252,122

[22] Filed: Oct. 3, 1988

Related U.S. Application Data

[63] Continuation-in-part of Ser. No. 814,468, Apr. 7, 1986, Pat. No. 4,775,455.

[51] Int. Cl.$^4$ .............................................. C25C 7/02
[52] U.S. Cl. ................................... 204/294; 204/61;
    204/67; 373/89; 373/93; 264/29.1; 264/105;
    252/511; 523/220; 524/59; 524/495; 524/540
[58] Field of Search ................... 204/294, 291, 61, 67;
    373/89, 93; 524/59, 66, 495-496, 540-542;
    523/220; 252/511; 264/29.1, 105; 313/327

[56] References Cited

U.S. PATENT DOCUMENTS

| 3,434,834 | 3/1982 | Akerberg et al. | 264/29.5 |
| 3,838,188 | 9/1974 | Farrell, Jr. | 264/29 |
| 3,969,124 | 7/1976 | Stewart | 106/56 |
| 4,430,459 | 2/1984 | Ackerberg et al. | 523/144 |
| 4,479,913 | 10/1984 | Ackerberg et al. | 264/29.5 |
| 4,526,924 | 7/1985 | Korb et al. | 524/496 |
| 4,624,984 | 11/1986 | Korb et al. | 524/541 |
| 4,775,455 | 10/1988 | Chandramouli et al. | 204/294 |

FOREIGN PATENT DOCUMENTS

| 0583671 | 9/1959 | Canada | 204/294 |
| 936514 | 9/1963 | United Kingdom . | |
| 8400565 | 2/1984 | World Int. Prop. O. | 204/294 |

OTHER PUBLICATIONS

"Carbon Products", Carboindustrial, S.A. brochure.

Primary Examiner—John F. Niebling
Assistant Examiner—Kathryn Gorgos
Attorney, Agent, or Firm—Robbins & Laramie

[57] ABSTRACT

The invention is a novel Soderberg electrode paste composition. The composition is a mixture comprising carbonaceous aggregate, novolac resin binder, plasticizer and optionally hexamethylenetetramine. The novolac resin of the binder has a melting point of at least 100° C. and a free phenol content of not more than 4% by weight based on the weight of novolac resin solids. The residual coking value of the composition of the invention is at least as great as the minimum preferred coking value of traditional Soderberg pastes which are based on coal tar pitch binder.

53 Claims, 1 Drawing Sheet

MANUFACTURE OF A SODERBERG ELECTRODE INCORPORATING A HIGH CARBON-CONTRIBUTING PHENOLIC SACRIFICIAL BINDER

RELATED APPLICATION

This application is a continuation-in-part of my co-pending application Ser. No. 848,468, filed Apr. 7, 1986, now U.S. Pat. No. 4,775,455 which is co-pending herewith.

FIELD OF THE INVENTION

This invention relates to a novel composition for use in the manufacture of a Soderberg electrode and to the improved electrode produced thereby. This composition includes a high carbon-contributing phenolic sacrificial binder.

BACKGROUND OF THE INVENTION

During the early 1900's, the technology was developed by Soderberg for the production of a continuous carbon electrode. The Soderberg process produces a self-baking electrode that is formed continuously from a soft carbon mixture that is baked in the same furnace in which it is used.

The Soderberg process is continuous, involving the addition of a paste to the upper end of the electrode-manufacturing apparatus. This paste is a mixture of a carbonaceous aggregate and a pitch binder. The paste has sufficient mobility to travel through the temperature gradient. The temperature increases as the paste approaches the electrolyte cell area. During this travel, the paste typically begins to harden into something akin to a jelly formation with loss of volatiles—the paste retaining thermoplasticity while not being too fluid to cause excessive overflow of the paste. The moving paste then approaches the use zone where it hardens and attains electrode integrity through densification and binder graphitization upon exposure to the operating temperatures of the electrolytic cell. In the cell, the electrode is not only used but is continually consumed.

The apparatus for making a Soderberg electrode consists of a ribbed cylinder of thin sheet iron into which the electrode paste is filled. Thus, the upper end of the equipment is filled with raw paste. The formed electrode that projects from the lower end of the Soderberg equipment is continuously consumed in the furnace. From time to time, the equipment is operated to permit the electrode, that has been formed in the equipment, to drop downwardly to replace the amount of electrode that has been consumed. This permits the paste in the upper end of the equipment to drop downwardly. During this process, the paste drops through a zone of increasing temperature, and the heat from the furnace bakes the paste. The material in the Soderberg equipment thus consists of an upper portion that is in mobile paste form, a lower portion that is a baked, hard electrode, and an intermediate portion in which the paste is gradually changing from mobile paste form to hard baked electrode form. For convenience, this three part structure will be referred to in this application as the electrode, although strictly speaking, only the baked lower portion functions as an electrode.

The cylindrical holder part of the Soderberg apparatus is generally of the water-cooled clasp type. It is designed to permit the electrode to move gradually at a predetermined rate or to slip down from time to time, and thus, to bring unbaked portions of the paste to higher and higher temperatures as they get closer and closer to the hot electrolytic cell zone. Slipping is effected by loosening the grip of the holder until the electrode slides down by its own weight. This manipulation of the electrode may be effected from a place situated at some distance from the furnace. Slipping of the electrode is ordinarily carried out under full load. Operation of the electrode is maintained during the entire process, so that current continues to pass through the electrode. The electrical contact is maintained by means of a sliding contact between the holder and the electrode casing.

In this art, the term "anode" is used where the carbon or graphite baked electrode is used as an anode in an actual electrolysis, as in the manufacture of aluminum or in electrolysis, as in the electrolysis of brine; and the term "electrode" refers to a generally similar article used for an application where the function is primarily carrying electrical current.

The rate at which a Soderberg electrode is consumed depends on the particular application for which it is being used. For example, in furnaces for the production of calcium carbide and ferro alloys, the feed rate may be in the range from about 4 inches to about 20 inches per day. Generally, the materials used in the manufacture of a Soderberg electrode are calcined anthracite, alone or with calcined petroleum coke, and a medium pitch.

Soderberg electrodes are used in several different applications. In the electrolytic production of aluminum, the anodes are predominantly produced by the prebaked process. However, substantial use of the Soderberg process still prevails in aluminum manufacturing operations around the world. The anode paste is ordinarily made from a base of petroleum coke.

The Soderberg process may also be used for making electrodes for use in electric furnaces. Generally these are what can be considered to be artificial graphite electrodes. The paste for such electrodes is made from low ash coal or petroleum coke. These materials are crushed and calcined to remove volatile matter, then mixed with tar or pitch as a binder. The resulting paste can then be used in the Soderberg process to make the desired electrode, or alternatively, the paste may be molded or extruded or pressed to produce a green electrode that is baked, then cleaned, and either used as such or machined to a desired shape for a specific use. Electrodes so produced, in general, are inferior in performance compared to the prebaked electrodes in their densities, plasticity, electrical properties and the like.

Soderberg electrodes are used principally in aluminum reduction, calcium carbide production, the production of electric pig iron, processing copper matte, and other kinds of ferro alloy and smelting operations. They are also used in the manufacture of phosphorus.

The green raw filler materials from which Soderberg electrodes are made may have a volatiles content in the range from 5% to 15%. Thus, for petroleum coke, 10% is typical. In the calcination operation, hydrocarbons are removed and the coke shrinks in volume, resulting in a density increase. The weight loss may be 25% or higher. If the raw material is not calcined, the release of volatiles and the shrinkage take place during electrode formation and may result in cracked structures.

In one Soderberg process that is currently in use, the electrode paste is made from electrically calcined anthracite, with coal tar based pitch and anthracene oil as the binder. In the formulation of the paste, the calcined anthracite normally amounts to from about 65% to about 70% by weight of the paste, the balance being provided by the coal tar pitch and the anthracene oil.

Coal tar pitch levels as high as 30% to 35% by weight of the paste are commonly used in binders in the Soderberg process. Such a high pitch content leads to extensive fume evolution and to a loss of volatiles, which in turn lead to electrodes having poor integrity. Additionally, coal tar pitch has been under heavy environmental pressures and scrutiny for carcinogenicity attributed to volatile components such as "pyrene". The evolution of these components are more predominantly visible (i.e. apparent) in the Soderberg process mainly due to the heavy exposure of the work force to such fumes in the Soderberg process.

Thus, operations using the Soderberg process are under heavy pressures to either install extensive and cost prohibitive environmental control measures or to resort to alternative processes such as the "Prebaked Electrode Process" which requires additional capital investment, extensive equipment renovation and retrofitting, or resort to more environmentally safe binder systems while not sacrificing the carbon efficiencies of the binder electrode. These drawbacks have turned the Soderberg process away from favor. However, even with pre-baked anodes, there are drawbacks such as porosity which is a major problem that requires strict controls to avoid oxidation and maximize carbon utilization.

To avoid these drawbacks, some furfuryl alcohol and/or furfural resins have been suggested for use in pitch binders in making Soderberg electrodes. Generally a resin would not only function as pitch does in a paste, that is, as a sacrificial binder, but a properly selected resin (binder) should while retaining the plasticity properties of coal tar pitch also contribute similar residual carbon values and structure upon hardening and pyrolysis. Furfuryl alcohol and furfural resins result in thermoset structures in the 200° F. (93° C.) to 500° F. (260° C.) range and lack in any flow and/or plasticity beyond this temperature. Additionally, both furfural and furfuryl alcohol are volatile monomers and the fumes are both noxious and toxic. Consequently, successful use of said binders in commercial applications is very limited.

The paste that is used in the conventional manufacture of Soderberg electrodes can be poured directly into the electrode equipment. Alternatively, it can be cast into blocks or other shapes for shipment and use. At room temperature, such blocks are hard and are easy to handle. When such blocks are heated to about 250° F., the pasty consistency is restored so that the paste can flow readily as required by the Soderberg equipment.

In summary, the Soderberg process of anode manufacture is an old method and is now generally considered economically inefficient. However, aluminum manufacturers around the world still have several operations producing aluminum using the Soderberg process. The Soderberg process anodes are using pitch at about 25–30% binder level and are plagued by environmental problems. The problems are mainly in the area of toxic vapors produced at the electrolyte cell area. The vapor control and adequate protection are issues that must be dealt with. The industry is faced with two alternatives: installing extensive pollution control involving substantial capital investments or exploring alternative environmentally safe and efficient binders.

DETAILED DESCRIPTION OF THE DRAWINGS

Figure 1:
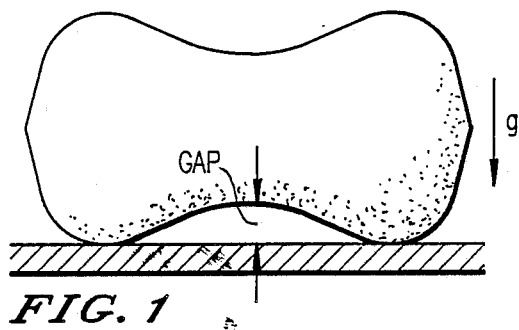
Figure 2:
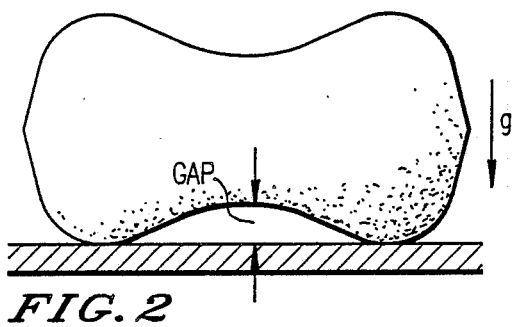
Figure 3A:
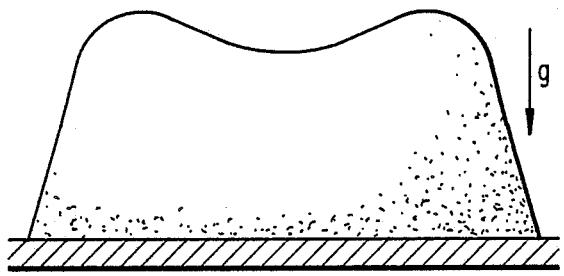
Figure 3B:
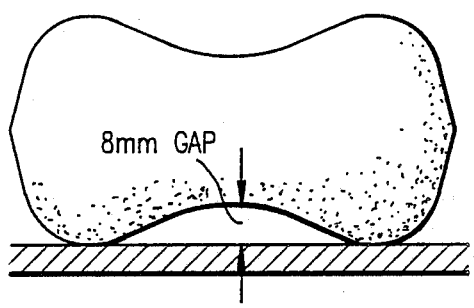
Figure 3C:
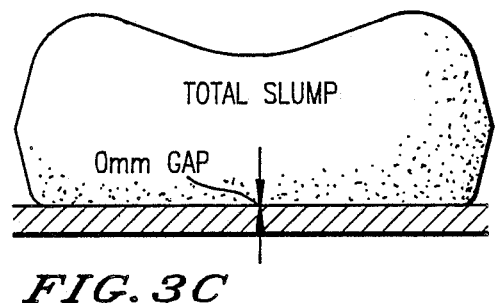

FIGS. 1, 2 and 3 relate to testing a composition for its suitability for use as the feedstock composition for a Soderberg electrode. The test comprises shaping and pressing a portion of a composition into a standard ASTM dog bone, placing the dog bone on a flat surface, heating the dog bone under Soderberg temperature conditions, and observing the heat treated dog bone.

FIG. 1 is a diagram of a ASTM dog bone resting on a flat tray. Two surfaces of the dog bone, made from a composition of the invention, rest on the tray. The maximum vertical height under the dog bone, between the two surfaces that rest on the tray, is designated as the gap height.

FIG. 2 is a diagram that shows a heat-treated dog bone made from a composition which would not be a suitable composition of the invention (a failed composition). The dog bone has been exposed to oven heat and after heating to Soderberg electrode temperatures a measurable gap height is still present. This means the bone did not flow adequately and the paste hardened. The composition that was used would therefore not have suitable flow properties and should not be used to make a Soderberg electrode.

FIG. 3 is a diagram that shows a heat-treated dog bone made from a composition which would probably be a suitable composition (i.e. a successful composition). The dog bone has been exposed to oven heat and the dog bone slumped totally. There is no longer any gap. The composition that was used would therefore have suitable flow properties for use in the manufacture of a Soderberg electrode.

SUMMARY OF THE INVENTION

The present invention is based on the use in the Soderberg process of a paste that incorporates as a sacrificial binder a high melting point phenolic novolac resin. The resins useful in the practice of the present invention are those novolacs with melting points of 100° C. or higher, and preferably, in the range from 110° C. to 140° C. Lower melt point resins while maybe providing sufficient plasticity, are not desirable as such resins, and in general, contribute to lower levels of residual carbon upon pyrolysis. Also lower melt point resins will be volatile (especially the monomer, dimer and trimer components) and may become airborne, causing environmental problems.

It is contemplated, while not preferred, that one could use some pitch in the binder in place of some of the novolac resin.

While in conventional phenolic resin practice, novolac resins (which are thermoplastic) are usually used in conjunction with hexamethylenetetramine (hexa) and/or thermosetting phenolic resole resins, as curing agents in order to render them thermosetting, such compositions tend to set to a very hard mass immediately upon exposure to temperatures of 100° C. and above and have no mobility.

It has surprisingly been found that when such novolac resins are used alone and properly selected for molecular weight (melt point), one can provide suitable compositions for use in Soderberg-based applications. Such compositions provide comparable and sometimes even better carbon compared to coal tar pitch. It has also been found that some novolac resins can be used with limited amounts of hexa and still retain the thermoplastic properties that are needed.

For example, with suitable novolac resins with melt points over 100° C., residual carbon-values of at least 50% are achieved when these resins are pyrolyzed under inert conditions to 800° C. (1472° F.). Such values are comparable to the retained carbon value of pyrolyzed coal tar pitch. Additionally, it has been found that said resins retain substantial high temperature mobility and plasticity in the presence of small quantities of a curing agent such as hexamethylenetetramine at levels of 5% or below and more preferably at 1.5% or less (based on phenolic novolac resin weight). Such compositions also contribute to improved carbon retention upon pyrolysis. Suitable curing agents include formaldehyde, and formaldehyde donors such as paraformaldehyde and trisaminohydroxymethane as well as hexamethylenetetramine. Hexamethylenetetramine is the preferred curing agent.

Coal tar pitch and prior art binders have been plagued by the evolution of noxious fumes and pungent odor problems. The novolac resins used in this invention are so manufactured and characterized that the free phenol (monomer) content of the resins are less than 4% by weight and preferably less than 2% by weight, based on resin solids. Thus the prior art problem of the evolution of noxious fumes can be substantially reduced.

While the novolac resins may be used by themselves, in actual practice preferably and advantageously one may choose to use a high boiling plasticizer such as the high boiling glycols, glycol ethers, esters, dibasic esters, pyrollidones, aromatic alcohols such as cyclohexanols, anthracene oil and the like. One might also use polymeric glycols such as polyethylene oxides and derivatives of the same. A suitable polymeric glycol composition is sold by Union Carbide Corporation under the trademark Carbowax. These plasticizers help maintain plasticity and fluidity of the paste mix through the various temperature zones of the Soderberg anode feed system. Preferred plasticizers will have a boiling point of about 200° C. (392° F.) or more and the plasticizer level preferably is kept at 50% or less based on the total binder weight. More preferably the plasticizer level is maintained at 20-40%. In choosing the plasticizer level, one has to consider the volatiles evolution level, carbon content and the desired fluidity as key factors. Examples of suitable high boiling glycols are ethylene glycol, diethylene glycol and triethylene glycol. The preferred glycols are diethylene glycol and triethylene glycol.

Whereas there is a high pollution hazard when coal tar pitch is used as the sacrificial binder in the Soderberg process, when novolac resins selected in accordance with the present invention are employed to provide the sacrificial binder at the levels of use required, the environmental and carcinogenic problems associated with the use of coal tar pitch are minimized.

The compositions made up in accordance with the invention may be used in the form of resin coated free-flowing granules that are poured, as needed, directly into the equipment used in making the Soderberg electrode. In this case, preferably, the resin is precoated on the particles of the carbonaceous aggregate. Alternatively, as is often done for convenience in shipment, the resin-coated granules may be preshaped by extrusion, pressing or molding techniques into solid preformed blocks or shapes that are easily handled, stored, shipped, and used, the resin in such a case serving as the binder and providing the green strength. The shapes or blocks ordinarily are placed in the equipment for making the Soderberg electrodes directly, and as the blocks come closer to the source of heat, they soften and flow to fill the interior of the equipment.

DETAILED DESCRIPTION OF THE INVENTION

The term "carbonaceous aggregate" is used herein to refer to the particulate carbon-containing material that is used in making compositions according to the present invention.

The solid particulate carbonaceous aggregate may be calcined anthracite, or petroleum coke, or other suitable low-ash carbonaceous material. A low content of impurities in the carbonaceous aggregate is highly desirable. The purity and electrical resistivity of the anode or other electrode produced by the Soderberg process are important. Thus, the resins are critically controlled to provide binders which are essentially free of the undesirable sulfur, sodium and other similar compounds.

The carbonaceous aggregate preferably is a sized coke aggregate. Thus the aggregate may be a mixture of fine particles, coarse particles, and an intermediate fraction of particles. Generally, all of these particles will have sizes in the range from 4 mesh to 200 mesh, U.S. Standard Sieve Size. Preferably, however, the mixture is graded, so that the fines comprise about 40% of the aggregate and pass through 100 mesh but are retained on 200 mesh, and the coarse particles comprise about 50% of the aggregate and are passed through 4 mesh but are retained on 14 mesh. The intermediate fraction of particles comprises the balance, that is, consists of particles intermediate between the fines and the coarse.

The carbonaceous aggregate may also comprise fillers such as carbon powder, graphite powder, or mixtures of these. These fillers should have particle sizes on the order of 325 mesh or so, but may be in the range from about 200 mesh to about 325 mesh. Such fine particle sizes facilitate packing and the production of high density articles.

For some purposes, coal particles per se may be included in the mix in small quantities. In some cases, it may be desirable also to include powdered carbon, powdered graphite, or mixtures of these. Generally powdered carbon would be incorporated in a substantial quantity in a carbonaceous aggregate intended for use in the production of electrodes. As a practical matter, powdered carbon and powdered graphite would not be used alone because they would not lead to an electrode having the desired electrical properties when used at economically viable levels. Rather, such powdered material should be used in combination with coke aggregate.

For anode production, for example, the carbonaceous aggregate would comprise petroleum coke, anthracite coke, or a mixture of these. The particle size would be in the range from 4 mesh to 200 mesh. Powdered graphite or powdered carbon would be incorporated in the aggregate to improve density or to improve electrical properties, in an amount of about 10% by weight of the carbonaceous aggregate. The selection of such materials is a matter within the skill of the art in making anodes, cathodes, and electrodes.

For anode, cathode, and electrode manufacture, the preferred process involves coating the carbonaceous aggregate through the use of a hot melt novolac resin. However, a flake resin may also be used. Additionally, the novolac resin may be used in a solution form in a low boiling/high boiling solvent, dispersion/emulsion form. When a low boiling solvent based solution or a dispersion/emulsion form is used, care should be exercised to remove all of the low boilers at the mixer (blender), prior to use in the Soderberg apparatus or prior to being shaped and packaged for later use.

If a hot melt novolac resin is used, a suitable mixer, such as a muller/mixer, like a Simson, Laice roller mixer or an Eirich type high intensity mixer, is generally filled with carbonaceous aggregate that is heated to a temperature close to or above the temperature of the hot melt resin. The mixer is started, and the hot melt resin is added. The end product preferably is in the form of free flowing granules, but if blocks or shapes are to be prepared, the end product may be a pasty mass that is poured into molds, vibrated, rammed, pressed or extruded into the desired shape or form.

If the resin is in the form of flakes, it may be added to the muller/mixer to heated carbonaceous aggregate, and it will melt and flow to coat the individual particles. In this case the end product may similarly be in the form of free flowing granules or a paste that is poured into molds to make blocks.

The particles of the carbonaceous aggregate may also be coated using a solution of resin in a volatile solvent or an emulsion/dispersion of the novolac. This is technically feasible but requires solvent recovery and/or removal of the moisture. From the standpoint of obtaining electrode characteristics of density, porosity, strength, and other electrical and chemical characteristics, the preferred novolac resins will be those having melting points above 100° C., and preferably in the range from 110° C. to 130° C. Melting points as high as 160° C. to 170° C. can be used, but involve the attendant penalties of increased energy costs and problems in processing and handling.

The novolac resin that is used should have a melting point of at least 100° C., and preferably at least 110° C. The higher the melting point, the higher the coking value, i.e., the residual carbon left in the carbonized body after pyrolysis. The novolac coating on the aggregate should have a low volatiles content, the total volatiles being not more than 5% by weight of the resin including not more than 4% by weight of free phenol, and more preferably, total volatiles should be not more than 2% by weight of the resin including not more than 2% by weight of free phenol. The volatiles content is measured at 135° C. This is a standard test in the phenolic resin industry, and indicates true solids. The selection of the resin will depend upon the particular end use for the article that is to be manufactured.

The resin coating may include materials other than the phenolic resin or resins. Generally, the amount of resin solids in the coating amount to from about 6% to about 20% by weight based on the weight of the carbonaceous aggregate, and preferably, from about 10% to about 17% by weight. For anode production, the resin generally will consist essentially of a novolac resin in hot melt form preferably, although a flake resin may be used. Novolac resins in other forms described above may also be used. A more preferred embodiment would be to use the novolac in the hot melt form or flake form in conjunction with a preferred high boiling solvent such as di- or triethylene glycol. Alternatively the high melt point resin may be used in the form of a solution in a high boiling solvent. A novolac resin may include an appropriate but small amount (preferably less than 2%) of hexamethylenetetramine or similar formaldehyde donors.

In formulating a composition for use in the Soderberg process, care is needed to achieve the balance of properties that is required. Thus, the properties that are required above the baking zone are quite different than those that are required below the baking zone. In the upper part of the electrode, above the baking zone, the composition must have good plasticity and flowability. Thus, it is important that the composition flow as it becomes warmed, to fill the Soderberg casing properly. It is also important that as it flows, it not separate into its individual components, but rather, remain homogeneous. Generally the flowability above the baking zone can be controlled by making suitable adjustments in the formulation, and in particular to the resin to plasticizer ratio. Should one choose to use resin only, a judicious selection of resins to get a good flowable paste can be made. Generally the amount of binder (i.e. resin, plasticizer and other additives employed in the paste) should be as low as is practicable.

Below the baking zone, the downwardly depending part of the electrode is its working portion, that is, the portion that carries the electrical current. The physical properties of the solid carbon material at the lower end of the electrode are of critical importance to the attainment of proper electrode function.

In the baked, lower end of the electrode, there are several properties that are important for proper operation. These include a low electrical resistivity, high mechanical strength, a low Young's modulus, low thermal expansion, high thermal conductivity and superior oxidation resistance. All of these properties can be controlled by adjusting the formulation from which the electrode is made.

The electrical resistivity and the thermal conductivity of the electrode are important with respect to the generation and distribution of heat in the electrode. They are also important factors in connection with the temperature profile in any horizontal plane taken through the electrode in operation.

HOT COATING

A suitable hot coating process consists of the following steps. A carbonaceous aggregate, preferably calcined anthracite in finely divided form, is heated to a temperature in the range from about 175° C. to about 200° C., and then transferred to a muller/mixer with heating capabilities, to maintain the elevated temperature. A selected flake novolac resin is then distributed over the aggregate as uniformly as possible, while mixing to insure uniform melting of the flake and coating of the aggregate with molten resin. Of course, it is possible to add to hot or cold aggregate a selected molten phenolic novolac resin suitable for use in the practice of the invention. It is also feasible that a novolac resin in a solution form in low boiling solvent or a water-borne dispersion/emulsion may be used to coat the aggregate. However, in such instances, care should be taken to make sure the low boilers are completely removed prior to being used in the Soderberg application. Alternatively, using a preferred embodiment of the invention, one can use a solution of the novolac in a high boiling plasticizer/solvent. When such a solution is used, the coating of the aggregate can be achieved by using either hot or cold aggregate particles.

When all of the resin has been added to the mixture, mixing is continued to promote uniform coating of the aggregate particles.

Hexa when desired should be added to the muller/mixer as a water solution. Alternatively, hexa may be added as solid but powdery granular material when added in this manner. It is preferably added to the dry aggregate and uniformly dispersed prior to mixing with the resin.

For density control, a plasticizer material selected from the alcohols, glycols, and the like, may be used.

To use the free flowing granular product from the muller/mixer, it may be poured in granular form into the casing of the Soderberg equipment. Alternatively, it may be molded, either by isostatic or compression molding, or vibration pressed, or extruded, to the desired shape to be put into the Soderberg equipment. Such shapes or blocks, upon passing down through the Soderberg equipment, flow when heated to conform to the internal surface of the Soderberg equipment.

To describe the invention in greater detail, several demonstrations of the invention are reported below, in the several examples. In these examples and elsewhere in this patent application, percentages are by weight unless otherwise noted, and temperatures are degrees Celsius unless expressly stated to be otherwise.

In all of the following examples, the aggregate was essentially a calcined petroleum coke mixture of varying size fine particles consisting of fines, intermediate size particles and coarse particles. Fines are defined as aggregate which passes 100 mesh but is retained on 200 mesh. Intermediate is defined as aggregate that passes 14 mesh but is retained by 100 mesh. Coarse is defined as aggregate that passes through 4 mesh and is retained by 14 mesh. The references to mesh sizes are to the U.S. Standard Sieve series.

COLD COATING AND PRESSING OF THE EXAMPLES

In all the examples, a cold coating process was used. The cold coating process consisted of placing the carbonaceous aggregate in a Hobart mixer and blending it with novolac resin, plasticizer and in some cases, hexa. Blending was continued until a uniform coating was achieved and a paste was formed.

All of the pastes were then used to prepare standard ASTM dog bones. In each case, 100 grams of paste was placed in a mold cavity and pressed to a dog bone in a Wabash press. A 12-ton pressure (5 inches ram) and 60 second pressing cycle were used.

HEAT TREATMENT OF THE EXAMPLES

After the dog bones were made as described above, they were removed from the mold and placed on a flat surface and exposed to elevated temperatures in a muffle furnace. A nitrogen atmosphere was maintained in the furnace during exposure. The shape of standard dog bones is illustrated in FIG. I. Each standard dog bone had two areas of contact with the flat surface on which it was placed before it was exposed to an elevated temperature. The gap created under each dog bone after it was placed on the surface had the standard maximum measurement (height) of 8 millimeters.

In all the runs of each example, except as noted, the carbonaceous aggregate used consisted of about 33% fines; 47% intermediate size particles and 20% coarse. In all examples a plasticizer was used in combination with a novolac resin in a ratio of 60 parts novolac to 40 parts of plasticizer on a weight basis. The % hexa when used in the examples is based on weight of the phenolic resin solids. The % free phenol in a novolac resin is based on the novolac resin, as is. The % free phenol is as measured using gas chromatography.

EXAMPLE 1

This example demonstrates the utility of high melt point phenolic novolac resins as binders for coke aggregate pastes for use as a feedstock composition in the Soderberg process.

In the Soderberg process, the flow of the binder in the feedstock composition is critical. It is the intention of this example to show the flow characteristics of several different pastes by using different novolac resins, different plasticizers and different amounts of hexa.

In each run, a paste was prepared and pressed into dog bones. The dog bones were then each removed from the press and placed in the muffle furnace. In all runs, the dog bones were exposed to the furnace temperature environment up to 500° C. for about 30 minutes and observed for flow properties during that time. Sagging of the dog bone after exposure to the oven heat was considered desirable. No flow was noted as a failure. When it was ascertained visually that a dog bone had become rigid and no longer deformed, the temperature at which this happened was recorded as the failure temperature. Complete sagging, that is a zero gap measurement, was considered to indicate the paste was suitable for use in a Soderberg electrode.

The results of the runs of this example are shown in Table 1. Each novolac resin used is identified by a letter. A detailed description of each resin is given in the footnote. After each dog bone was removed from the oven, it was observed and the observations were recorded as shown.

TABLE 1

| Novolac Resin (1) | Approximate Melting Point Of Resin | % Free Phenol | % Novolac Resin* | % Hexa | Plasticizer Used (2) | Failure Temp. °C. | Comments (3) |
|---|---|---|---|---|---|---|---|
| A | 90° C. | 6–10 | 10 | 0 | E.G. | 150 | 1,2 |
|   |   |   | 15 | 0 | " | 200 | 1,2 |
|   |   |   | 20 | 0 | " | 400 | 1,2 |
| A | 90° C. | 6–10 | 10 | 2 | " | 150 | 1,2 |
|   |   |   | 15 | 2 | " | 200 | 1,2 |
|   |   |   | 20 | 2 | " | 400 | 1,2 |
| A | 90° C. | 6–10 | 10 | 5 | " | 150 | 1 |
|   |   |   | 10 | 10 | " | 150 | 1 |
|   |   |   | 20 | 5 | " | 150 | 1,2,3 |
| B | 90° C. | 6–10 | 10 | 0 | " | 150 | 1 |
|   |   |   | 10 | 2 | " | 150 | 1 |

TABLE 1-continued

| Novolac Resin (1) | Approximate Melting Point Of Resin | % Free Phenol | % Novolac Resin* | % Hexa | Plasticizer Used (2) | Failure Temp. °C. | Comments (3) |
|---|---|---|---|---|---|---|---|
|  |  |  | 15 | 0 | " | 150 | 1 |
|  |  |  | 15 | 2 | " | 150 |  |
| C | 110–115° C. | <3 | 10 | 9 | " | 200 |  |
|  |  |  | 10 | 9 | T.E.G. | 200 | 4 |
|  |  |  | 15 | 9 | " | 300 | 4 |
|  |  |  | 15 | 9 | M.P. | 500 | 4 |
|  |  |  | 20 | 9 | T.E.G. | 400 | 4 |
| D | 80–90° C. | <0.1 | 10 | 0 | E.G. | 200 | 5 |
|  |  |  | 10 | 2 | " | 200 | 5 |
|  |  |  | 10 | 0 | T.E.G. | 300 | 6 |
|  |  |  | 20 | 0 | E.G. | 200 | 6 |
|  |  |  |  | 2 | T.E.G. | 300 | 6 |
| E | 115–120° C. | <2 | 10 | 0 | E.G. | 300 | 7 |
|  |  |  | 10 | 2 | E.G | 300 | 7 |
|  |  |  | 10 | 0 | T.E.G. | 500 | 7 |
|  |  |  | 10 | 2 | " | 500 | 7 |
|  |  |  | 15 | 0 | " | 500 | 7 |
|  |  |  | 15 | 2 | " | 500 | 7 |
|  |  |  | 20 | 0 | " | 500 | 7 |
|  |  |  | 20 | 2 | " | 500 | 7 |
|  |  |  | 20 | 2 | M.P. | 500 | 7 |
|  |  |  | 20 | 0 | D.B.E.-4 | 500 | 7 |
| F | 140–150° C. | <0.5** | 15 | 2 | M.P | 500 | 7 |
|  |  |  | 15 | 2 | T.E.G. | 500 | 7 |
|  |  |  | 15 | 2 | E.G. | 500 | 7 |

*based on resin solids, expressed as a % of the sum of resin solids plus aggregate
**Meta Cresol (1) Resins A, B, C, D and E were commercial resins. Resin F was an experimental resin. Descriptions of each resin are as follows:
  A. A novolac resin with about a 90° C. melt point sold as a 65% solids solution in ethylene glycol at a viscosity of 4500–6500 cps @ 25° C. and a free phenol content of 6–10%.
  B. A novolac resin similar to above in polymer structure, except sold as a 70–75% solids solution in ethylene glycol at a viscosity of 20,000–40,000 cps (about 20% glycol content).
  C. A novolac resin with a 110° C.–115° C. melt point and a free phenol content of 3.0% maximum compounded with hexa at 9% and ground to a powder with 98% passing through 200 mesh.
  D. A novolac with <0.1% phenol and a melt point of 85–90° C. sold in the flake form and ground to pass 98% through 200 mesh
  E. A commercial novolac with <2.0% phenol and a melt point of 115–120° C. sold in powder form to pass 98% through 200 mesh.:
  F. An experimental meta cresol formaldehyde novolac resin, with <0.5% free meta cresol and a melt point range of 140–150° C. ground to pass 98% through 200 mesh.

(2) Plasticizers used were as follows:
  E.G. = ethylene glycol, (boiling point, 198° C.)
  T.E.G. = triethylene glycol (boiling point, 287° C.)
  M.P. = m-pyrol (i.e. N—methyl pyrrolinone, boiling point 202° C.)
  D.B.E.-4 = a dibasic ester composition made by DuPont: dimethyl succinate (boiling point 196° C.).

(3) Comments were as follows:
  1. Excessive phenol odor.
  2. Slight deformation of shape.
  3. Very slight deformation.
  4. More integrity/slight expansion.
  5. Dry flaky appearance/possible resin evaporation.
  6. More integrity.
  7. Uniform sagging (no gap).

(1) Resins A, B, C, D and E were commercial resins. Resin F was an experimental resin. Descriptions of each resin are as follows:

A. A novolac resin with about a 90° C. melt point sold as a 65% solids solution in ethylene glycol at a viscosity of 4500–6500 cps @ 25° C. and a free phenol content of 6–10%.

B. A novolac resin similar to above in polymer structure, except sold as a 70–75% solids solution in ethylene glycol at a viscosity of 20,000–40,000 cps (about 20% glycol content).

C. A novolac resin with a 110° C. melt point and a free phenol content of 3.0% maximum compounded with hexa at 9% and ground to a powder with 98% passing through 200 mesh.

D. A novolac with <0.1% phenol and a melt point of 85°–90° C. sold in the flake form and ground to pass 98% through 200 mesh.

E. A commercial novolac with <2.0% phenol and a melt point of 115°–120° C. sold in powder form to pass 98% through 200 mesh.

F. An experimental meta cresol formaldehyde novolac resin, with <0.5% free meta cresol and a melt point range of 140°–150°C., ground to pass 98% through 200 mesh.

(2) Plasticizers used were as follows:
E.G.=ethylene glycol, (boiling point, 198° C.)
T.E.G.=triethylene glycol (boiling point, 287° C.)
M.P.=m-pyrol (i.e. N-methyl pyrrolinone, boiling point 202° C.)
D.B.E.-4=dibasic ester composition made by DuPont: dimethyl succinate (boiling point 196° C.).

(3) Comments were as follows:
1. Excessive phenol odor.
2. Slight deformation of shape.
3. Very slight deformation.
4. More integrity/slight expansion.
5. Dry flaky appearance/possible resin evaporation.
6. More integrity.
7. Uniform sagging (no gap).

CONCLUSIONS REACHED FROM THE RESINS OF EXAMPLE 1

If a dog bone had plasticity left while it was heated to temperatures of about 500° C., the resin used in the dog bone would be considered especially suitable for use in the feedstock of a Soderberg electrode.

In the runs using resins A, B or D (melting points below 100° C.) unsuitable failure temperatures (temperatures well below 500° C.) were noted regardless of the levels of hexa that were used.

In the runs using resins C, E and F (melting points above 100° C.) unsuitable failure temperatures were noted if 9% hexa was used. However, suitable plasticity at 500° C. was possible if the amount of hexa used was 2% or less together with, in some cases, a higher boiling plasticizer.

In short, the data of this example shows that higher molecular weight novolacs with high boiling solvents and little or no hexa appear to provide plasticity and fluidity to the paste mix upon exposure to temperatures of about 500° C., which temperatures are more commonly seen in the operating environments with the Soderberg process. Therefore, these novolacs with high boiling solvents and little or no hexa would be appropriate for use in making the binder for Soderberg electrodes.

EXAMPLE 2

The runs of this example attempt to more clearly quantify the fluidity and plasticity aspects of the paste mixes when exposed to elevated temperatures. The coke aggregate mix was essentially the same as used in Example 1. The blending, mixing, and pressing procedures were similar to the procedures outlined in Example 1. In all cases of this example, the dog bones were tested for flow properties at about 500° C. for 30 minutes. The dog bones in each case, after removal from the furnace, were allowed to cool down, allowed to stand on a flat surface and the gap in the center was quantitatively measured. The lower the gap measurement number, the better the plasticity and fluidity of the paste.

A maximum gap measurement of 8 millimeters indicates no flow, (i.e. no change in the dimensions of the dog bone from its cold pressed state). Such paste would be unsuitable for application in the Soderberg process. A gap measurement of zero would identify a useful composition.

The results of the runs of this example are shown in Table 2.

TABLE 2

| Resin (1) | Approximate Melting Point | % Free Phenol | % (2) Resin | % Hexa | Gap Measurement Millimeters |
|---|---|---|---|---|---|
| Commercial Novolac Powder 'G' | 105–110 | <3.5 | 15 | <2 | 5.3 |
|  |  |  | 15 | 4 | 5.3 |
| Commercial Novolac Powder 'E' | 115–120 | <2.0 | 15 | 0 | 0 |
|  |  |  | 15 | 4 | 3 |
| Experimental Novolac Powder 'F' | 140–150 | <0.05 | 15 | 0 | 0 |
|  |  |  | 15 | 4 | 0 |

(1) Description of each resin is as follows:
G: Novolac powder with a melt point of 105–110° C. range and a free phenol content of <3.5%. Powdered to pass through 200 mesh @ 98%.
E & F are resins as described in Example 1.
(2) Based on resin solids, expressed as a % of the sum of resin solids plus aggregate.
Note: In the runs of this example, the plasticizer triethylene glycol was used. The resin to plasticizer ratio was the same as in the first example: (i.e. 60:40).

CONCLUSIONS REACHED FROM EXAMPLE 2

In Example 2, three resins with melting points greater than 100° C. were tested. Resin F, the resin with the highest melting point range (140° C.–150°C.), was suitable for Soderberg use whether it was used with 4% hexa or with no hexa at all. Resin E with the next highest melting point range (115° C.–120° C.) was suitable for Soderberg use if no hexa was used but not as suitable if 4% hexa was used. Resin F with the lowest melting point range (105° C.-110° C.) had lesser suitability when it was used with measurable amounts of hexa.

From these examples, it is apparent that novolac resins of >100° C. melt point when used in combination with triethylene glycol and hexa levels of 2% or less serve as good binders for Soderberg paste compositions because the pastes made from these binders have excellent flow properties at temperatures of 500° C.

EXAMPLE 3

In this example the aggregate composition was 10% coarse, 58% intermediate and 32% fine. The phenolic resin level was 15% based on aggregate plus resin solids. A phenolic resin to triethylene glycol ratio of 60/40 was used. The blending, mixing, and pressing procedure were similar to the procedures outlined in Example 1. In all cases of this example, the dog bones were tested for flow properties at about 500° C. for 30 minutes. The dog bones in each case, after removal from the furnace were allowed to cool down, allowed to stand on a flat surface and the gap center was quantitatively measured. The lower the gap measurement number, the better the plasticity and fluidity of the paste.

The results of the runs of the example are shown in Table 3.

TABLE 3

| Resin Type | Approximate Melting Point | % Free Phenol | % Hexa | Gap Measurement millimeters |
|---|---|---|---|---|
| A | 90° C. | 66-10 | 0 | 1 |
| A | 90° C. | 6-10 | 9 | 3 |
| E | 115-120° C. | <2.0 | 9 | 3 |

CONCLUSION REACHED FROM EXAMPLE 3

In Example 3, resin A, a low melting resin (90° C.) and resin E, a high melting point resin (115°-120° C.) were treated and again showed that the low melting point resin is unsuitable for Soderberg use whether a high level or a zero level of hexa is used and again showed that higher melting point resins are not suitable if the level of hexa is as high as 9%.

It is possible to compare the resin E runs of Example 2 with the resin E runs of Example 3 (although slightly different percentages were used in the aggregate composition). Example 2 showed that resin E is satisfactory for Soderberg use if no hexa is used while Example 3 showed that resin E is not satisfactory if the level of hexa is 9%.

EXAMPLE 4

This example provides a relationship of coking value and polymer molecular weight (melt point) and extent of cure (impact of hexa content). In the preparation of Soderberg Pastes, coal tar pitch with residual coking values of 45% or greater are preferred.

The results of the runs of the example are shown in Table 4.

TABLE 4

| Resin Type | Approximate Melting Point | Coking Value (%)* |
|---|---|---|
| A | 90° C. | 40 |
| C | 110-115° C. | 45 |
| D | 85-90 C. | 35 |
| E | 115-120° C. | 50 |
| F | 140-150° C. | 58 |
| Hexa based on Phenolic solids | | |
| E + 2% Hexa | 115-120° C. | 53 |
| E + 9% Hexa | 115-120° C. | 58 |
| C + 4% Hexa | 110-115° C. | 50 |

*Carbon (coking) values based on thermogravimetric analysis.

CONCLUSIONS REACHED FROM EXAMPLE 4

The novolac resins of the example with a melting point greater than 100° C. had coking values equal to or greater than the coking value of coal tar pitch. When hexa was used, the coking value increased. This example shows that the use of novolac resins with a melting point greater than 100° C. instead of coal tar pitch in the Soderberg paste is advantageous and provides improved coking values to the electrode.

CONCLUSIONS REACHED FROM THE EXAMPLES

A satisfactory Soderberg electrode paste can be made using novolac resin as the binder for the paste if the novolac resin has a melting point of 100° C. or higher, preferably a melting point in the range of 110°-140° C. The novolac can be used together with a low amount of hexamethylenetetraamine equal or less than 5% by weight of resin solids). It has been estimated that the amount of hexamethylenetetraamine should be at a level of 3% or less, preferably 1.5%-2.5%. Example 1 demonstrated if satisfactory Soderberg electrode paste is to be made using novolac resin as the binder, the novolac resin should have a phenol content of less than 6%. It has been estimated that the novolac resin more preferably should have a free phenol content of no more than 4%.

CONCLUSION

The invention provides several important advantages to those industries using Soderberg electrodes. The density of an electrode correlates with properties such as strength, erosion resistance, electrical resistivity and carbon consumption. Electrodes made in accordance with this invention are expected to have superior properties when compared to cold tar pitch.

The data in the examples demonstrate that satisfactory and even superior performing Soderberg pastes can be made using the high carbon phenolic novolacs of this invention.

While powdered calcined anthracite is a preferred carbonaceous aggregate for use in the present invention, it and similar aggregate materials that are suitable for use may be mixed with powdered anthracite, powdered carbon, powdered graphite, or the like, for fine tuning the physical and electrical properties of the product that is to be produced in the Soderberg equipment.

In general, use of the invention offers advantages as to the amount of binder required, purity of the binder, substantial reduction in the amount of undesired chemical materials present, superior structure in the product, ready availability of raw materials, and improved environmental safety compared to coal tar pitch.

Thus, a phenolic resin binder, selected in accordance with the present invention, when used at levels of 10–15% of binder solids based on carbonaceous aggregate, provides binder performance in Soderberg paste and also in the carbonized product comparable to what is obtained when pitch is used in an amount of 30% to 35% by weight based on the aggregate.

The ash content and purity of the binder are extremely important for anode and electrode performance. The use of a resin binder in accordance with the present invention affords better control over these parameters. In contrast, the industry presently is finding it increasingly difficult to control these parameters when using coal tar pitch. Similarly, the use of a resin binder in accordance with the invention provides better control over such variables as quinolone insolubles, benzene insolubles, and the like, that are often considered to be a problem when a pitch binder is used. As a result, the common custom of blending different grades of coal tar pitch, for optimum performance may be eliminated. Uniformity of product from batch to batch, and the capability of consistently producing product meeting high specifications for optimum performance is enhanced.

The reduced amount of binder required, according to the present invention, affords the opportunity for better control over anode porosity, which is critical for control of electrical properties. Generally, improved structural integrity is obtained. Similarly, in many cases, improved erosion resistance can be observed.

From the standpoint of environmental safety, pollution and gassing are substantially reduced, which is a distinct benefit for domestic industry. Any risk of carcinogenicity, that might be associated with the escape into the atmosphere of materials from coal tar pitch, is reduced.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed:

1. A feedstock composition for the production of a Soderberg continuous carbon electrode wherein said composition has sufficient mobility to travel through the Soderberg temperature gradient as a moving viscous bed and wherein said moving viscous bed of heated composition enters a use zone of said Soderberg electrode as a paste, hardens, and attains electrode integrity, comprising
    a mixture of particulate carbonaceous aggregate, phenolic resin binder, plasticizer, and hexamethylenetetramine wherein said plasticizer has a boiling point above 200° C., wherein the amount of said plasticizer is greater than 0%–50% by weight based on the combined weight of resin solids and plasticizer; and wherein the amount of said hexamethylenetetramine is from 0% to no more than 5% by weight based on phenolic resin solids, said mixture retaining a plasticity at 200° C.,
    said phenolic resin binder comprising a phenolic novalac resin characterized by a minimum melt point of 100° C. and a free phenol content of not more than 4% by weight as measured by gas chromatography analysis.

2. The composition of claim 1 wherein said feedstock composition comprises pitch wherein the weight amount of said pitch is equal to and less than the weight amount of said phenolic novolac resin.

3. The feedstock composition of claim 1 wherein the plasticizer has a boiling point of at least 250° C.

4. The feedstock composition of claim 1, wherein said plasticizer is selected from the group consisting of a glycol, ester, aromatic alcohol, anthracene oil, pyrol and mixtures thereof.

5. The composition of claim 4 wherein said glycol is diethylene glycol or triethylene glycol.

6. The composition of claim 4 wherein said glycol is a polyethylene glycol.

7. The composition of claim 4 wherein said plasticizer is a dibasic ester selected from the group consisting of adipic dimethyl ester, glutaric dimethyl ester, succinic dimethyl ester and mixtures thereof.

8. The composition of claim 4 wherein said plasticizer is an aromatic alcohol.

9. The composition of claim 4 wherein said plasticizer is a heterocyclic compound.

10. The composition of claim 4 wherein said plasticizer is an anthracene oil or a naphthalenic compound.

11. The feedstock composition of claim 4, wherein said ester comprises a glycol ester.

12. The feedstock composition of claim 1 wherein said free phenol content is not more than 2% by weight as measured by gas chromatography analysis.

13. A feedstock composition for the production of a Soderberg continuous carbon electrode wherein said composition has sufficient mobility to travel through the Soderberg temperature gradient as a moving viscous bed and wherein said viscous bed enters a use zone of said Soderberg electrode, retains plasticity at about 500° C., hardens and attains electrode integrity comprising
    free flowing particulate resin coated, carbonaceous aggregate, plasticizer having a boiling point above 200° C. wherein the amount of said plasticizer is of 0–50% based on the total weight of resin solids and plasticizer, and hexamethylene-tetramine wherein the amount of said hexamethylenetetramine is from 0% to no more than 5% based on phenolic resin solids,
    said resin coated carbonaceous aggregate being formed from a mixture comprising phenolic novolac resin and particulate carbonaceous aggregate.

14. The feedstock composition of claim 13 wherein said phenolic novolac resin used for coating said particulate carbonaceous aggregate was in flake form or in hot melt form.

15. The composition of claim 13 wherein said phenolic novolac resin used to coat said particulate carbonaceous aggregate was a solution wherein the solvent of said solution had a boiling point greater than 150° C.

16. The composition of claim 13 wherein said phenolic novolac resin used to coat said particulate carbonaceous aggregate was a solution wherein the solvent of said solution had a boiling point low enough so that the solvent is removed by evaporation during the mixing of said mixture.

17. The feedstock of claim 13 wherein said phenolic novolac resin used to coat said particulate carbonaceous aggregate was in a water-borne dispersion/emulsion form.

18. A process for making a feedstock composition for a Soderberg continuous carbon electrode prepared from a particulate carbonaceous aggregate, a resin binder comprising a phenol formaldehyde novolac resin in particulate or hot melt form, and hexamethylenetetramine, said novolac having a melting point of at least 100° C., a total volatiles content at 135° C. and not more than 5% by weight of said resin solids including a free phenol content of not more than 4% by weight of said resin solids as measured by gas chromatography analysis, comprising:

mixing said particulate aggregate with sufficient resin binder so that the solids of said resin comprise 6%–15% by weight of said aggregate and with 0%–5% by weight of hexamethylenetetramine based on the weight of said phenol formaldehyde novolac to coat said aggregate to produce a free flowing resin-coated aggregate material.

19. The free flowing resin-coated aggregate material formed by the process of claim 18.

20. The free flowing resin-coated aggregate material formed by the process of claim 18 wherein said material is shaped and packaged.

21. The free flowing resin-coated aggregate material formed by the process of claim 18 wherein said material comprises a plasticizer.

22. A process for making a feedstock composition for the production of a Soderberg continuous carbon electrode wherein said feedstock has sufficient mobility to travel through the Soderberg temperature gradient as a moving viscous bed of heated paste that retains plasticity at about 500° C. and to enter a use zone of said Soderberg electrode wherein said heated moving bed of viscous paste hardens and attains electrode integrity comprising mixing particulate carbonaceous aggregate, curable resin binder, plasticizer having a boiling point above 200° C. wherein the amount of said plasticizer is greater than 0–50% based on the combined weight of resin solids and plasticizer, and hexamethylenetetramine wherein the amount of said hexamethylenetetramine is from 0% to no more than 5% based on resin solids, until a free flowing resin-coated aggregate material is formed, wherein said curable resin binder comprises a novolac resin in an amount of from about 5% to about 20% by weight of resin solids based on the weight of said carbonaceous aggregate, said plasticizer and said curing agent if used being present in amounts sufficient to impart sufficient mobility and flowability to said paste as it travels toward said use zone.

23. The process of claim 22, wherein said plasticizer is selected from the group consisting of a glycol, ester, aromatic alcohol, anthracene oil, pyrol, and mixtures thereof.

24. The process of claim 23 wherein said glycol is diethylene glycol or triethylene glycol.

25. The process of claim 23 wherein said glycol is polyethylene glycol.

26. The process of claim 23, wherein said ester comprises a glycol ester.

27. The process of claim 22 wherein said plasticizer is a dibasic ester selected from a group consisting of adipic dimethyl ester, glutaric dimethyl ester, succinic dimethyl ester and mixtures thereof.

28. The process of claim 22 wherein said plasticizer is an aromatic alcohol.

29. The process of claim 22 wherein said plasticizer is a heterocyclic compound.

30. The process of claim 29, wherein said heterocyclic compound is 2-pyrrolidone.

31. The process of claim 22, wherein said plasticizer is an anthracenic compound or a naphthalenic compound.

32. The process of claim 31, wherein said anthracenic compound is anthracene oil.

33. The process of claim 22 wherein said curable resin binder is a phenolic novolac resin with a free phenolic content of less than 3% as measured by gas chromatography analysis.

34. The process of claim 22 for making a Soderberg continuous carbon electrode, wherein the feedstock composition comprises a mixture of particulate carbonaceous aggregate, phenolic resin binder, plasticizer and hexamethylenetetramine, wherein said plasticizer has a boiling point of above 200° C., wherein the weight amount of said plasticizer is greater than 0%–50% based on the combined weight of resin solids and plasticizer, and wherein the weight amount of said hexamethylenetetramine is 0% to no more than 5% based on phenolic resin solids, said phenolic resin binder comprising phenolic novolac resin characterized by a minimum melt point of 100° C. and a free phenol content of not more than 4% by weight as measured by gas chromatography analysis.

35. A Soderberg electrode made by the process of claim 34.

36. A Soderberg electrode of claim 35, wherein said electrode is useful for the electrolytic production of aluminum.

37. A Soderberg electrode of claim 35, wherein said electrode is useful in the production of calcium carbide.

38. A Soderberg electrode of claim 35, wherein said electrode is useful in an electric furnace.

39. A process for making a Soderberg electrode comprising the steps of (1) passing a feedstock that retains plasticity above 200° C. of resin-coated carbonaceous particles through the three Soderberg electrode forming zones wherein in a first zone said feedstock moves downwardly toward a baking zone in the form of discrete, free-flowing particles;

(2) in said baking zone passing said feedstock through a temperature gradient and converting said feedstock from discrete free-flowing particles to a bed of a viscous paste that moves downwardly toward an electrode-forming and use zone; and (3) in said electrode-forming and use zone hardening said paste into a continuous electrode shape and then using said shape as a continuously-formed Soderberg electrode;

wherein said feedstock comprises an admixture of resin coated carbonaceous aggregate, plasticizer having a boiling point of at least 200° C. wherein the amount of said plasticizer is greater than 0%–50% based on the total weight of resin solids and plasticizer, and hexamethylenetetramine wherein the amount of said hexamethylenetetramine is from 0% to no more than 5% based on resin solids, said resin coated carbonaceous aggregate comprising a phenolic novolac resin coated on particles of a particulate carbonaceous aggregate.

40. The process of claim 39 wherein said feedstock composition comprises pitch in a weight amount equal to or less than the weight amount of said phenolic novolac resin.

41. The process of claim 39 wherein said plasticizer has a boiling point of at least 250° C.

42. The process of claim 39, wherein said plasticizer has a boiling point above 200° C. and is selected from the group consisting of a glycol, ester, aromatic alcohol, anthracene oil, pyrol, and mixtures thereof.

43. The process of claim 42 wherein said glycol is diethylene glycol or triethylene glycol.

44. The process of claim 42 wherein said glycol is a polyethylene glycol.

45. The process of claim 42, wherein said ester is glycol ester.

46. The process of claim 39 wherein said plasticizer is a dibasic ester selected from the group consisting of adipic dimethyl ester, glutaric dimethyl ester, succinic dimethyl ester, and mixtures thereof.

47. The process of claim 39 wherein said plasticizer is an aromatic alcohol.

48. The process of claim 39, wherein said plasticizer is a heterocyclic compound.

49. The process of claim 48, wherein said heterocyclic compound is 2-pyrrolidone.

50. The process of claim 39, wherein said plasticizer is an anthracenic compound or a naphthalenic compound.

51. The process of claim 50, wherein said anthracenic compound is anthracene oil.

52. The process of claim 39 wherein said resin has a free phenol content of not more than 4% by weight as measured by gas chromatography analysis, and said resin is characterized by a minimum melt point of 100° C.

53. The process of claim 52 wherein said resin has a total volatiles content of not more than 5% by weight of solids content.

* * * * *